United States Patent Office 3,326,786
Patented June 20, 1967

3,326,786
METHOD FOR PRODUCING A PERFUME BY EXPOSURE TO IONIZING RADIATION
Shosaku Kinoshita, Sakai-shi, and Tsuyoshi Sunada, Amagasaki-shi, Japan, assignors to Gisen Sato, Governor of Osaka Prefecture, Higashi-ku, Osaka, Japan
No Drawing. Filed May 6, 1963, Ser. No. 278,465
Claims priority, application Japan, Nov. 27, 1962, 37/53,165
4 Claims. (Cl. 204—158)

This invention relates, in general, to the method for producing perfume by exposure to ionizing radiation and more particularly, to the method for producing vanillin or heliotropin by irradiating phenol derivatives such as isoeugenol or isosafrol respectively with ionizing radiation.

The object of this invention is to produce vanillin or heliotropin of good quality at a high yield and a low cost of production.

Recently the consumption of vanillin and heliotropin which are commonly used as an additive to foods or toilet articles or as a base of scents, has increased enormously in the world. These perfumes have been produced hitherto by oxidizing isoeugenol or isosafrol respectively, often using ozone or other oxidizing chemicals. In such cases, however, troublesome or/and expensive procedures have been necessary more or less, and moreover, their yields have scarcely amounted to about 60% at the most. From the view point of low cost of production, the method to produce vanillin from lignin is more excellent than from other materials, but the flavor of thus produced lignin-vanillin is not better than clove-vanillin which is produced from isoeugenol. Thus, a method to produce vanillin or heliotropin of better flavor at a high output as well as a low cost has long been sought. Now, the production of perfumes of good quality at a high yield and a low cost has been made possible by the unique method of the present invention, i.e., by exposure to ionizing radiation instead of ozone oxidation or the like which have exclusively been used to date.

Practical examples are indicated as in the following:

Example I

When 0.054 g. of isoeugenol in close contact with 2.5 cc. of oxygen were given a dose of $10^8$ rads ($r$) of $\gamma$-irradiation with water-cooling, 0.05 g. of vanillin (about 100% yield) were found to be produced. The sequence is:

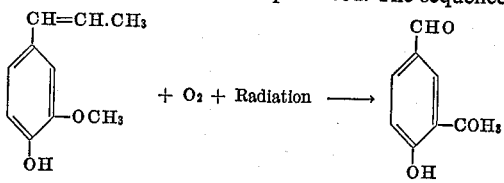

Example II

When 0.054 g. of isosafrol in close contact with 2.5 cc. of oxygen were irradiated with a dose of $10^8$ rads ($r$) of high speed electrons from a linear accelerator, 0.05 g. of heliotropin (about 100% yield) were found to be produced. The sequence is:

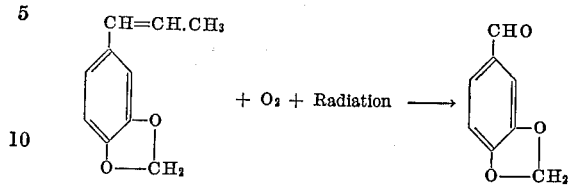

Mechanism of the productive reactions in these cases has not been fully clarified yet, but the sequence of these reactions could be supposed to be as follows:

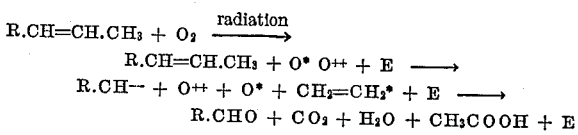

where

\*—exited atom
+,-—ion
E—energy
R.CH=CH.CH$_3$—isoeugenol or isosafrol respectively
R.CHO—vanillin or heliotropin respectively No radioactivity, of course, has been detected from any of the perfumes produced by this newly invented method and they had better flavor and furthermore did not change in quality even on long-term—storage. Thus, this invention represents a contribution to the art of the production of such perfumes, for which there has been an enormous demand by an ever increasing number of consumers.

While the foregoing description is directed to presently preferred embodiments of this invention, such description is not intended to be limitative of the scope of the invention.

We claim:
1. A method of producing perfume by irradiation, which comprises converting isoeugenol to vanillin by irradiating the former with high energy ionizing radiation.
2. A method of producing perfume by irradiation, which comprises converting isosafrol to heliotropin by irradiating the former with high energy ionizing radiation.
3. A method according to claim 1, wherein the ionizing radiation is in the form of $\gamma$-rays.
4. A method according to claim 2, wherein the ionizing radiation is in the form of high speed electrons from a linear accelerator.

No references cited.

JOHN H. MACK, *Primary Examiner.*
H. S. WILLIAMS, *Assistant Examiner.*